United States Patent
Song

(10) Patent No.: US 11,200,278 B2
(45) Date of Patent: Dec. 14, 2021

(54) METHOD AND APPARATUS FOR DETERMINING BACKGROUND MUSIC OF A VIDEO, TERMINAL DEVICE AND STORAGE MEDIUM

(71) Applicant: BEIJING MICROLIVE VISION TECHNOLOGY CO., LTD, Beijing (CN)

(72) Inventor: Yu Song, Beijing (CN)

(73) Assignee: BEIJING MICROLIVE VISION TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 17/016,914

(22) Filed: Sep. 10, 2020

(65) Prior Publication Data
US 2021/0026886 A1    Jan. 28, 2021

Related U.S. Application Data

(63) Continuation of application No. PCT/CN2018/124759, filed on Dec. 28, 2018.

(30) Foreign Application Priority Data

Jul. 6, 2018  (CN) .......................... 201810737153.2

(51) Int. Cl.
*G06F 16/783*  (2019.01)
*G06F 16/78*   (2019.01)
(Continued)

(52) U.S. Cl.
CPC .......... *G06F 16/7834* (2019.01); *G06F 3/165* (2013.01); *G06F 16/7867* (2019.01); *G06K 9/00744* (2013.01)

(58) Field of Classification Search
CPC .. G06F 16/7834; G06F 16/7867; G06F 3/165; G06K 9/00744
(Continued)

(56) References Cited

U.S. PATENT DOCUMENTS

2001/0033741 A1   10/2001  Miyashita
2009/0238536 A1*   9/2009  Gratton ................... H04N 5/91
                                                     386/285
(Continued)

FOREIGN PATENT DOCUMENTS

CN    103208298 A    7/2013
CN    105611404 A    5/2016
(Continued)

OTHER PUBLICATIONS

International Search Report and Written Opinion dated Mar. 28, 2019 for PCT Patent Application PCT/CN2018/124759.
(Continued)

*Primary Examiner* — Loi H Tran
(74) *Attorney, Agent, or Firm* — Thomas | Horstemeyer LLP

(57) ABSTRACT

Provided are a method and apparatus for determining background music of a video, a terminal device, and a storage medium. The method includes: acquiring a scene selection instruction, and performing video capturing based on the scene selection instruction; after the video capturing is completed and a music selection instruction for the captured video is detected, displaying a music replacement interface; and determining background music of the captured video according to music selected on the music replacement interface.

15 Claims, 13 Drawing Sheets

(51) Int. Cl.
*G06F 3/16* (2006.01)
*G06K 9/00* (2006.01)

(58) Field of Classification Search
USPC .......................................................... 700/94
See application file for complete search history.

(56) References Cited

U.S. PATENT DOCUMENTS

| | | | | |
|---|---|---|---|---|
| 2011/0153047 | A1* | 6/2011 | Cameron | G06F 3/16 700/94 |
| 2015/0302839 | A1* | 10/2015 | Georges | G10H 7/02 84/645 |
| 2016/0227173 | A1* | 8/2016 | Yamaguchi | H04N 9/8205 |
| 2018/0158488 | A1* | 6/2018 | Mangru | H04N 21/41407 |

FOREIGN PATENT DOCUMENTS

| | | | |
|---|---|---|---|
| CN | 105681676 | A | 6/2016 |
| CN | 106131475 | A * | 11/2016 |
| CN | 106131475 | A | 11/2016 |
| CN | 106851394 | A * | 6/2017 |
| CN | 106851394 | A | 6/2017 |
| CN | 107135366 | A | 9/2017 |
| CN | 107959873 | A | 4/2018 |
| CN | 108900902 | A | 11/2018 |

OTHER PUBLICATIONS

1st Search Report dated Apr. 16, 2019 for Chinese Patent Application No. 201810737153.2.
1st Office Action dated Apr. 24, 2019 for Chinese Patent Application No. 201810737153.2.
2nd Office Action dated Sep. 27, 2019 for Chinese Patent Application No. 201810737153.2.
3rd Office Action dated Jan. 21, 2020 for Chinese Patent Application No. 201810737153.2.
Supplementary Search dated Sep. 19, 2019 for Chinese Patent Application No. 201810737153.2.

* cited by examiner

METHOD AND APPARATUS FOR
DETERMINING BACKGROUND MUSIC OF
A VIDEO, TERMINAL DEVICE AND
STORAGE MEDIUM

CROSS REFERENCE TO RELATED APPLICATIONS

This is continuation of International Patent Application No. PCT/CN2018/124759, filed on Dec. 28, 2018, which is based on and claims priority to Chinese Patent Application No. 201810737153.2 filed with the CNIPA on Jul. 6, 2018, disclosures of which are incorporated herein by reference in their entireties.

TECHNICAL FIELD

Embodiments of the present disclosure relate to the field of video processing technologies, for example, to a method and apparatus for determining background music of a video, a terminal device, and a storage medium.

BACKGROUND

With continuous development of Internet and the information technology, an internet application on a terminal has also developed unprecedentedly, so an internet application that supports video sharing has emerged. A user can use the application (APP) on the terminal to capture a video and publish the video after the capturing is completed, thus sharing the video captured by oneself with other users.

In the related art, after the user captures the video, if the user is relatively satisfied with the captured video but not satisfied with background music during preview, the user needs to reselect the background music and recapture the video. In this way, a result that the user is satisfied with the background music but not satisfied with the recaptured video may occur, so that the user needs to repeatedly select the background music and recapture the video, thereby wasting user's time.

SUMMARY

Embodiments of the present disclosure provide a method and apparatus for determining background music of a video, a terminal device, and a storage medium. Background music can be selected for a captured video without recapturing the video, thus saving capture time.

An embodiment of the present disclosure provides a method for determining background music of a video, and the method includes steps described below.

A scene selection instruction is acquired, and video capturing is performed based on the scene selection instruction.

After the video capturing is completed and a music selection instruction for the captured video is detected, a music replacement interface is displayed.

Background music of the captured video is determined according to music selected on the music replacement interface.

An embodiment of the present disclosure provides an apparatus for determining background music of a video, and the apparatus includes a video capturing module, a music replacement module, and a background music substitution module.

The video capturing module is configured to acquire a scene selection instruction, and perform video capturing based on the scene selection instruction.

The music replacement module is configured to after the video capturing is completed and a music selection instruction for the captured video is detected, display a music replacement interface.

The background music substitution module is configured to determine background music of the captured video according to background music selected on the music replacement interface.

An embodiment of the present disclosure further provides a terminal device, and the terminal device includes one or more processors and a storage apparatus.

The storing apparatus is configured to store one or more programs.

When executed by the one or more processors, the one or more programs is configured to, when executed by the one or more processors, cause the one or more processors to implement the method for determining the background music of the video described in any one of the embodiments of the present disclosure.

An embodiment of the present disclosure further provides a non-transitory computer-readable storage medium configured to store at least one computer program, where the at least one computer program is configured to, when executed by a processor, cause the processor to implement the method for determining the background music of the video described in any one of the embodiments of the present disclosure.

In the solutions of the embodiments of the present disclosure, after the video is captured based on different scene selection instructions, if the music selection instruction for the captured video is detected, the music replacement interface is displayed; and the background music of the captured video is determined according to the music selected on the music replacement interface. In this way, if a user is not satisfied with only the background music after capturing the video, the user does not need to reselect the music and recapture the video, and only needs to select the background music for the captured video, thus saving capture time.

DETAILED DESCRIPTION

Figure 1:
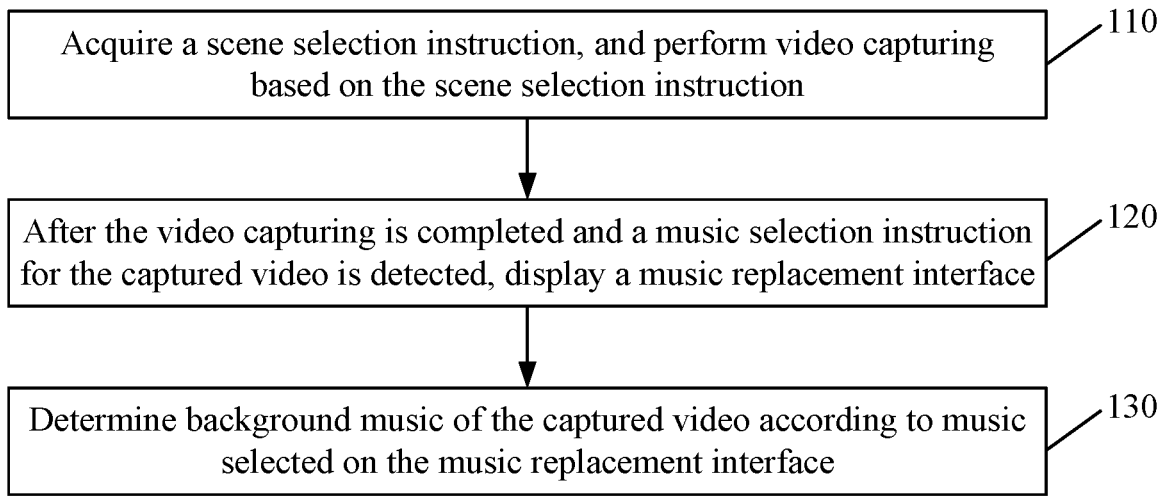
FIG. 1 is a flowchart of a method for determining background music of a video according to an embodiment of the present disclosure.

The present disclosure will be described below in conjunction with the drawings and embodiments. The specific embodiments set forth below are merely intended to explain and not to limit the present disclosure. In addition, for ease of description, merely part, not all, of the content related to the present disclosure is illustrated in the drawings.

FIG. 1 is a flowchart of a method for determining background music of a video according to an embodiment of the present disclosure. This embodiment may be applied to a case where the background music of the video is selected after the video is captured. The method can be executed by an apparatus for determining the background music of the video. The apparatus can be implemented by software and/or hardware, and generally can be integrated into a terminal device such as a mobile phone or a tablet computer. The method includes steps described below.

In step 110, a scene selection instruction is acquired, and video capturing is performed based on the scene selection instruction.

In this embodiment, the scene selection instruction refers to that a user selects a scene for entering a video capturing interface, that is, entering an entrance of the video capturing interface. For example, the user can first select background music and then enter the video capturing interface to perform the video capturing, or the user can directly enter the video capturing interface to perform the video capturing without selecting the background music.

After the scene selection instruction is acquired, the video capturing interface is entered based on the scene selection instruction, and the video capturing is started.

In step 120, after the video capturing is completed and a music selection instruction for a captured video is detected, a music replacement interface is displayed.

In this embodiment, the music replacement interface includes multiple pieces of music. A user can select one of the multiple pieces of music as changed background music. A display form of the music replacement interface may be displayed in a form of information flow, that is, a terminal device requests a server to acquire set amount of music first, the set amount of music is displayed through a sliding operation of the user, the terminal device requests the server again when a refresh operation of the user is detected, and the server returns the set amount of music again.

After the video capturing is completed, the user can change the background music for the captured video. After the music selection instruction of the user on the captured video is detected, the music replacement interface is displayed, and the user can select music he/she likes as the changed background music on the music replacement interface.

In step 130, the background music of the captured video is determined according to the music selected on the music replacement interface.

After the user selects the music on the music replacement interface, the background music of the video is determined in combination with the scene selection instruction. For example, when the scene selection instruction is that the capturing is performed after the user selects the background music, the background music of the captured video is background music initially selected by the user, and after the user selects the music on the music replacement interface, the initially selected background music is replaced with the music selected on the music replacement interface, and thus the background music of the video is changed to the music subsequently selected by the user. When the scene selection instruction is directly performing the capturing, that is, when the user does not select background music for capturing, the background music of the captured video is a recorded scene sound, the music selected by the user on the music replacement interface and the scene sound are superposed at this time, and the superposed music is taken as the background music of the captured video.

In the solutions of this embodiment, after the video is captured based on different scene selection instructions, if the music selection instruction for the captured video is detected, the music replacement interface is displayed; and the background music of the captured video is determined according to the background music selected on the music replacement interface. In this way, if the user is not satisfied with only the background music after capturing the video, the user does not need to reselect the music and recapture the video, and only needs to select the background music for the captured video, thus saving capturing time.

Figure 2:
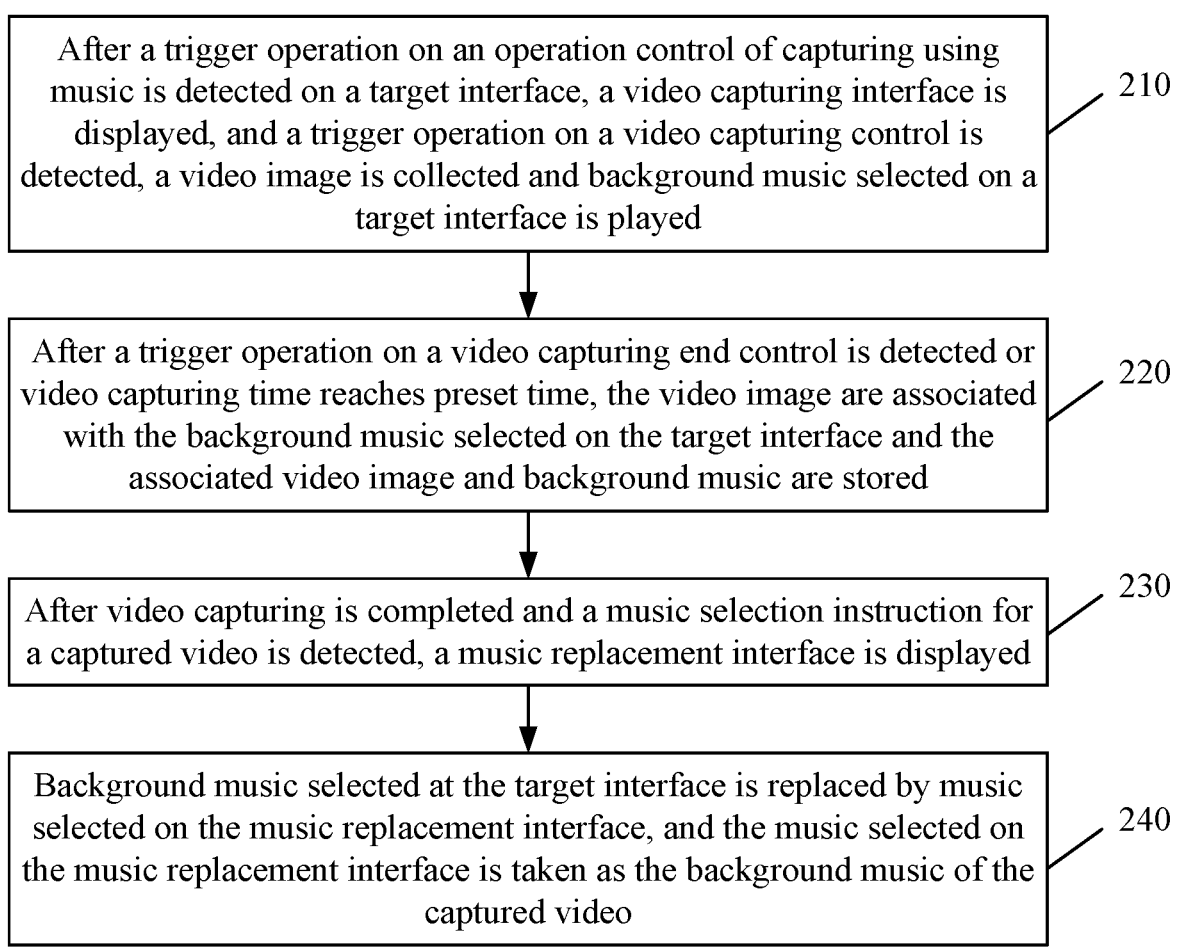
FIG. 2 is a flowchart of another method for determining background music of a video according to an embodiment of the present disclosure.

FIG. 2 is a flowchart of another method for determining background music of a video according to an embodiment of the present disclosure. This embodiment is described on the basis of the above-mentioned embodiment. This embodiment mainly describes the method for determining the background music of the video by using the scene selection instruction that the capturing is performed after the user selects the background music. The method includes steps described below.

In step 210, after a trigger operation on an operation control of capturing using music is detected on a target interface, a video capturing interface is displayed, and after a trigger operation on a video capturing control is detected, a video image is collected and background music selected on a target interface is played.

Figure 3A:
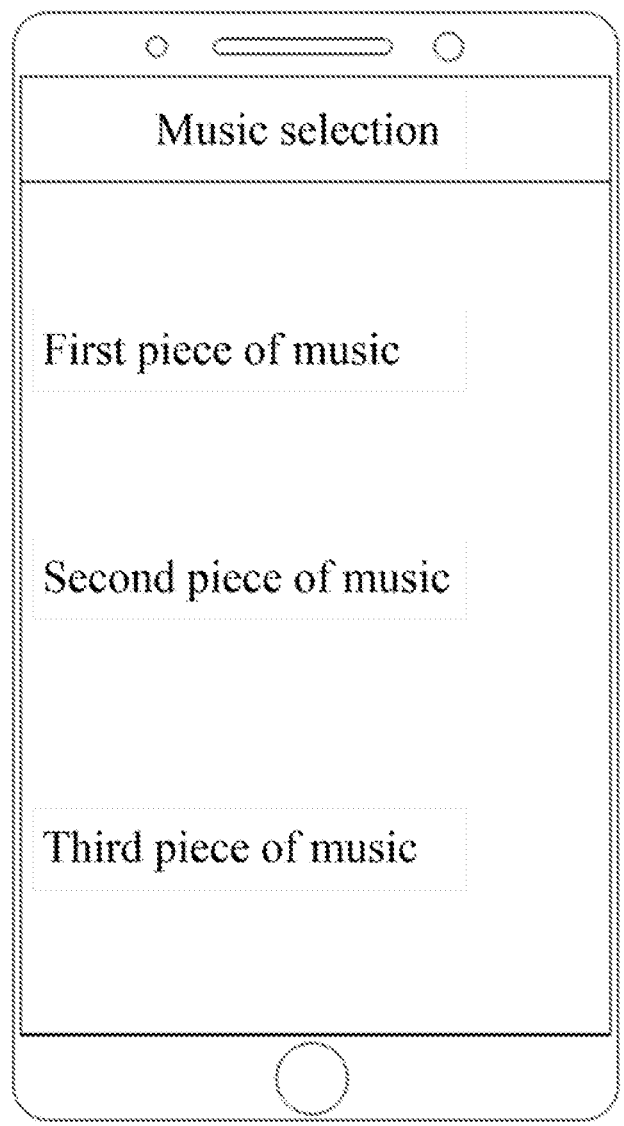
FIG. 3A is a schematic diagram of a music selection interface according to an embodiment of the present disclosure.

In this embodiment, the target interface may be a music selection interface, and shown in FIG. 3A, the music selection interface includes a plurality of pieces of music.

Figure 3B:
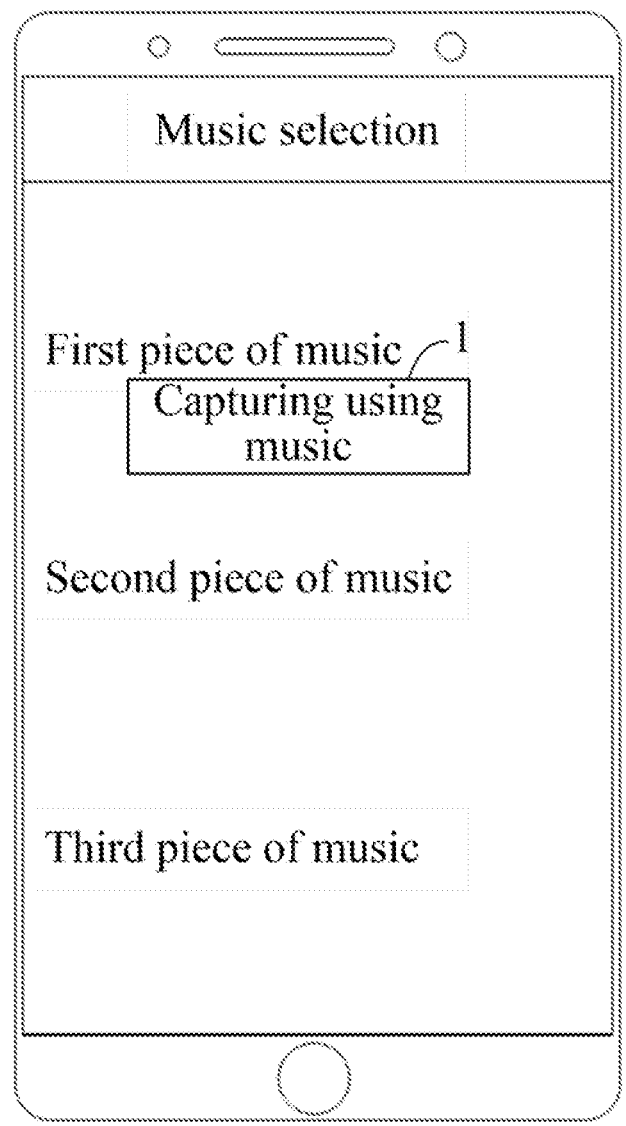
FIG. 3B is a schematic diagram of a music selection interface displaying an operation control of capturing using music according to an embodiment of the present disclosure.
Figure 3C:
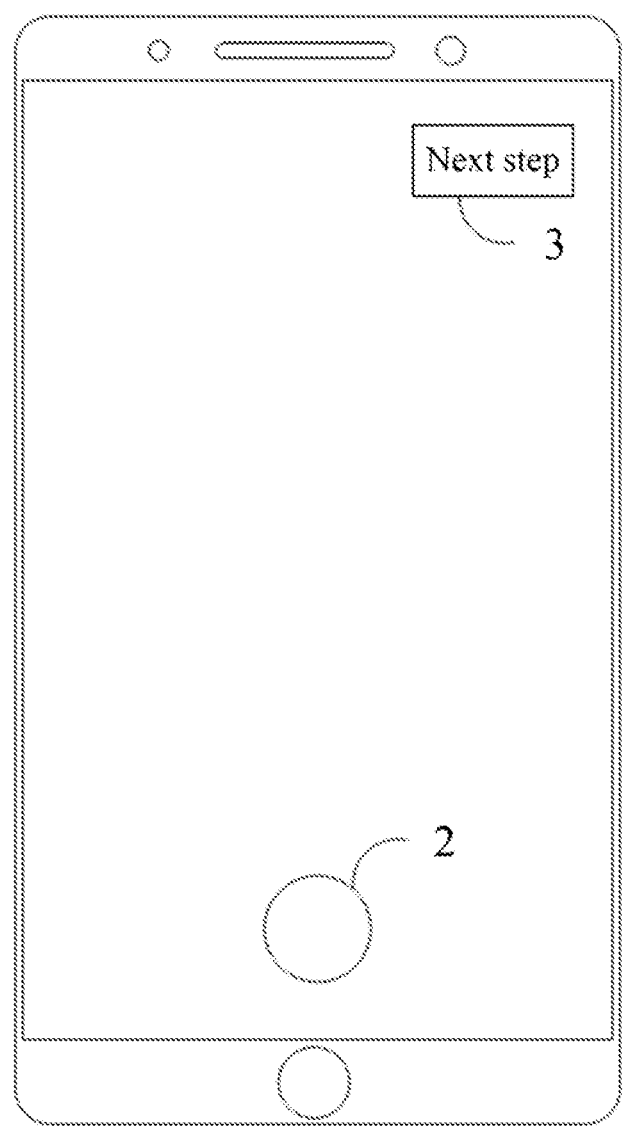
FIG. 3C is a schematic diagram of a video capturing interface according to an embodiment of the present disclosure.

After the user selects a piece of music at the target interface, as shown in FIG. 3B, an operation control 1 of capturing using music will be displayed corresponding to the music. If the trigger operation of the user on the operation control of capturing using music is detected on the target interface, the video capturing interface is jumped to. As shown in FIG. 3C, the video capturing interface includes a video capturing control 2. If the trigger operation of the user on the video capturing control 2 is detected, collecting the video image is started, and the background music selected by the user is played while the video image is collected without collecting a scene sound.

In step 220, after a trigger operation on a video capturing end control is detected or video capturing time reaches preset time, the video image and the background music selected on the target interface are associated, and the associated video image and background music are stored.

In this embodiment, the video capturing interface further includes a capturing end control, such as a next-step operation control 3 shown in FIG. 3C.

After the trigger operation on the video capturing end control is detected or the video capturing time reaches the preset time, the video capturing is determined to be finished, the collected video image and the background music selected by the user at the target interface are associated, and the associated video image and background music are stored.

In step 230, after the video capturing is completed and a music selection instruction for a captured video is detected, a music replacement interface is displayed.

Figure 3D:
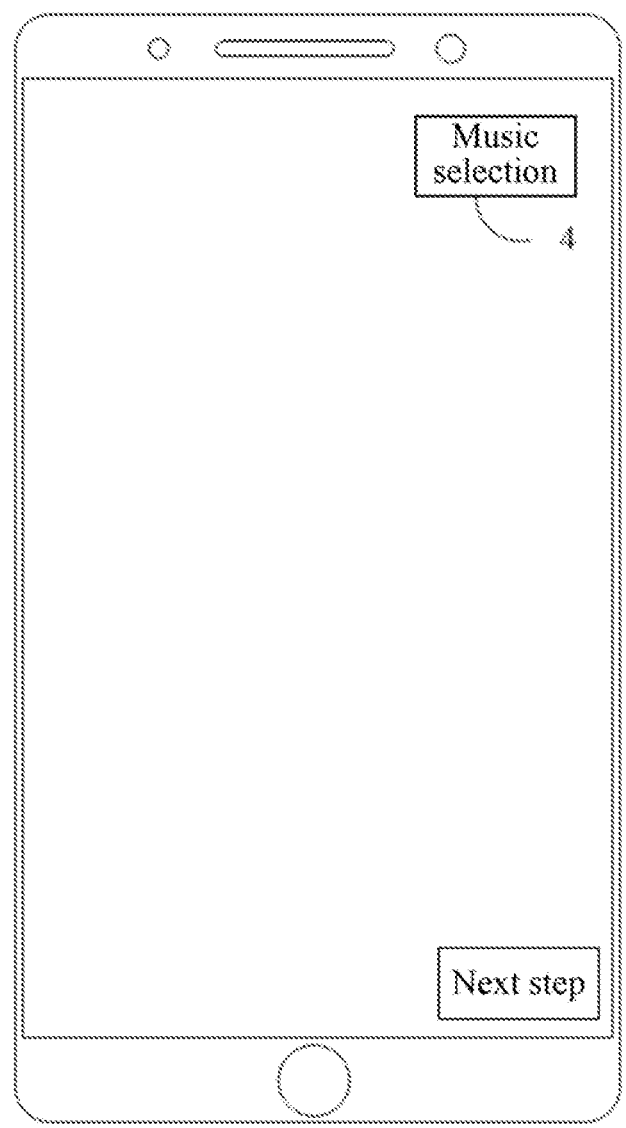
FIG. 3D is a schematic diagram of a video preview playing interface according to an embodiment of the present disclosure.

In this embodiment, the music selection instruction may be that the user triggers a music-selection operation control, such as the music-selection operation control 4 shown in FIG. 3D.

Figure 3E:
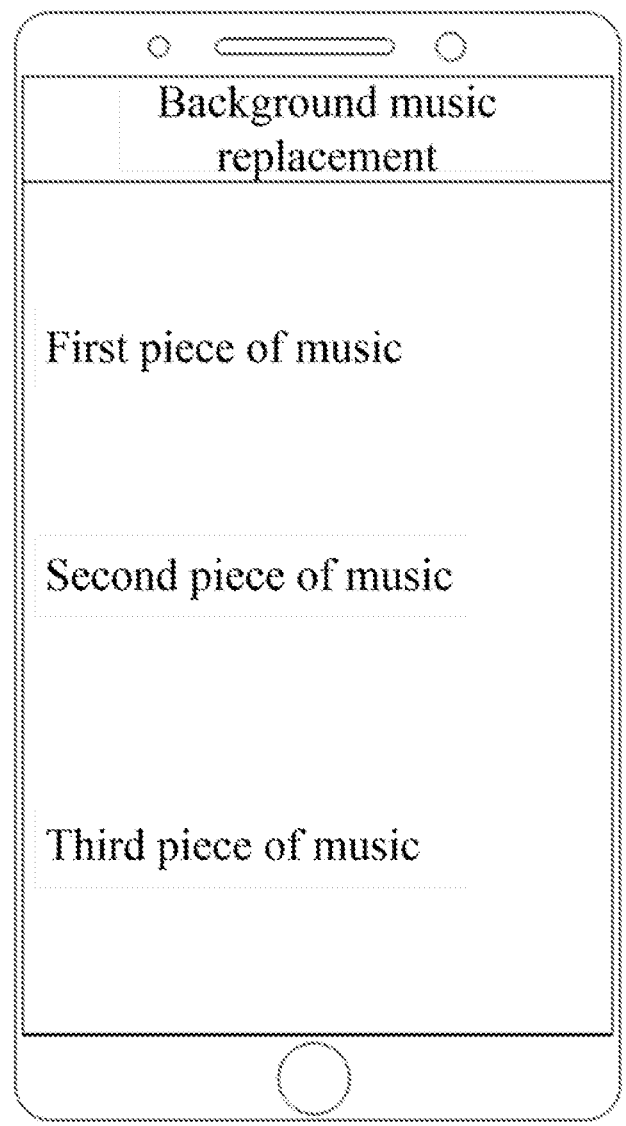
FIG. 3E is a schematic diagram of a music replacement interface according to an embodiment of the present disclosure.

After the video capturing is completed, a preview playing interface as shown in FIG. 3D of a video is displayed, the captured video and the background music initially selected by the user are previewed and played on the preview playing interface. After the trigger operation of the user on the music-selection operation control 4 is detected, the music replacement interface as shown in FIG. 3E is jumped to. In this embodiment, the music replacement interface and the target interface have same display content, except that title names of interfaces are different.

In step 240, the background music selected at the target interface is replaced by music selected on the music replacement interface, and the music selected on the music replacement interface is taken as the background music of the captured video.

Figure 3F:
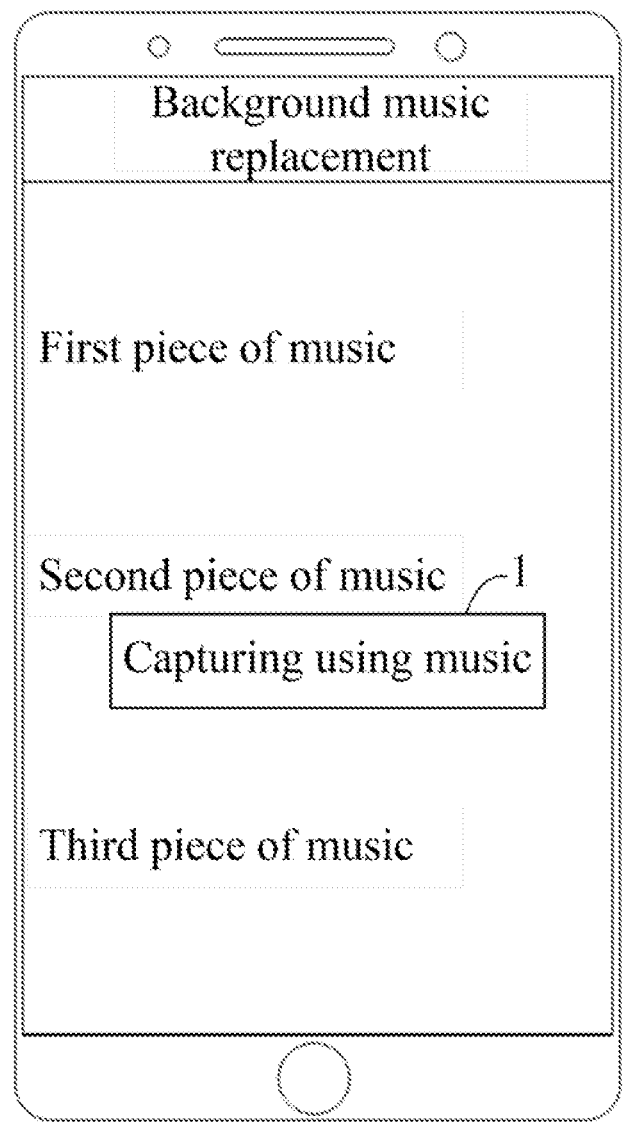
FIG. 3F is a schematic diagram of a music replacement interface displaying an operation control of capturing using music according to an embodiment of the present disclosure.

On the music replacement interface, when the user is detected to select a certain piece of music, as shown in FIG. 3F, the operation control 1 of capturing using music is displayed corresponding to the certain piece of music. If the trigger operation of the user on the operation control 1 of capturing using music is detected, the background music of the captured video, i.e., the background music initially selected by the user, is replaced with the music selected by the user on the music replacement interface, that is, the associated-stored background is replaced with the music selected by the user on the music replacement interface, and thereby the video image and the background music selected by the user on the music replacement interface are associated and the associated video image and the background music are stored, and the preview playing interface as shown in FIG. 3D of the video is jumped to. The video and the music selected by the user on the music replacement interface are played at the preview playing interface. If a trigger operation of the user on a confirmation operation control is detected at the preview playing interface, the video image and the music selected by the user on the music replacement interface are synthesized into a video file. If the user is still not satisfied with the background music corresponding to the preview-played video, the user can continue to trigger the music-selection operation control and reselect the background music.

In the solutions of this embodiment, after the trigger operation on the operation control of capturing using music is detected on the target interface, the video capturing interface is displayed, and after the trigger operation on the video capturing control is detected, the video image is collected and background music selected at the target interface is played; after the trigger operation on the video capturing end control is detected or the video capturing time reaches the preset time, the video image and the background music selected at the target interface are associated, and the associated video image and the background music are stored; and after the music selection instruction on the captured video is detected, the music replacement interface is displayed, and the background music selected before the video capturing is replaced by the music selected on the music replacement interface. In this way, after the user captures the video, if the user is not satisfied with the background music of the captured video, the background music can be directly replaced without recapturing a video, thereby saving capturing time.

Figure 4:
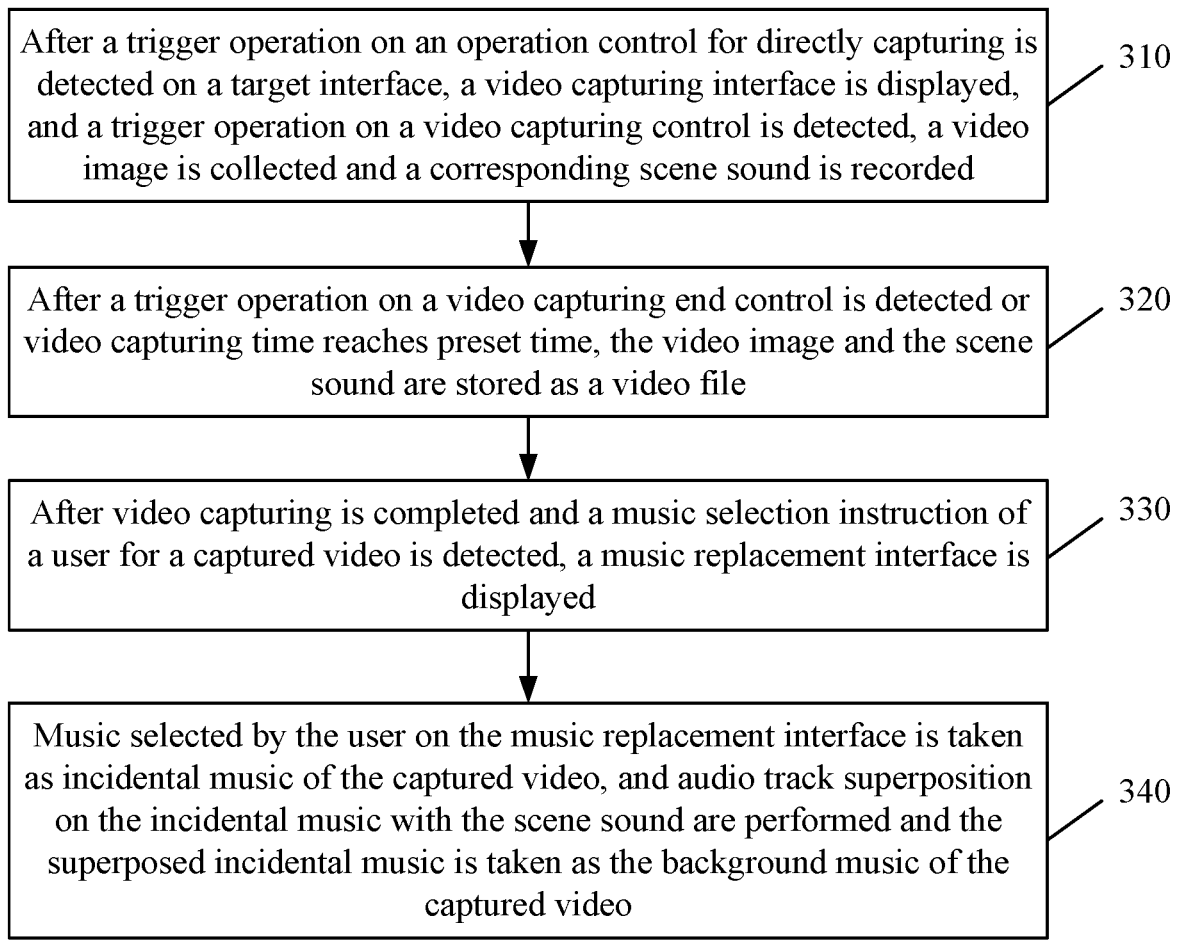
FIG. 4 is a flowchart of another method for determining background music of a video according to an embodiment of the present disclosure.

FIG. 4 is a flowchart of a method for determining background music of a video according to an embodiment of the present disclosure. This embodiment is described on the basis of the above-mentioned embodiment. This embodiment mainly describes the method for determining the background music of the video by using the scene selection instruction that the capturing is directly performed. The method includes steps described below.

In step 310, after a trigger operation on an operation control for directly capturing is detected on a target interface, a video capturing interface is displayed, and a trigger operation on a video capturing control is detected, a video image is collected and a corresponding scene sound is recorded.

Figure 5A:
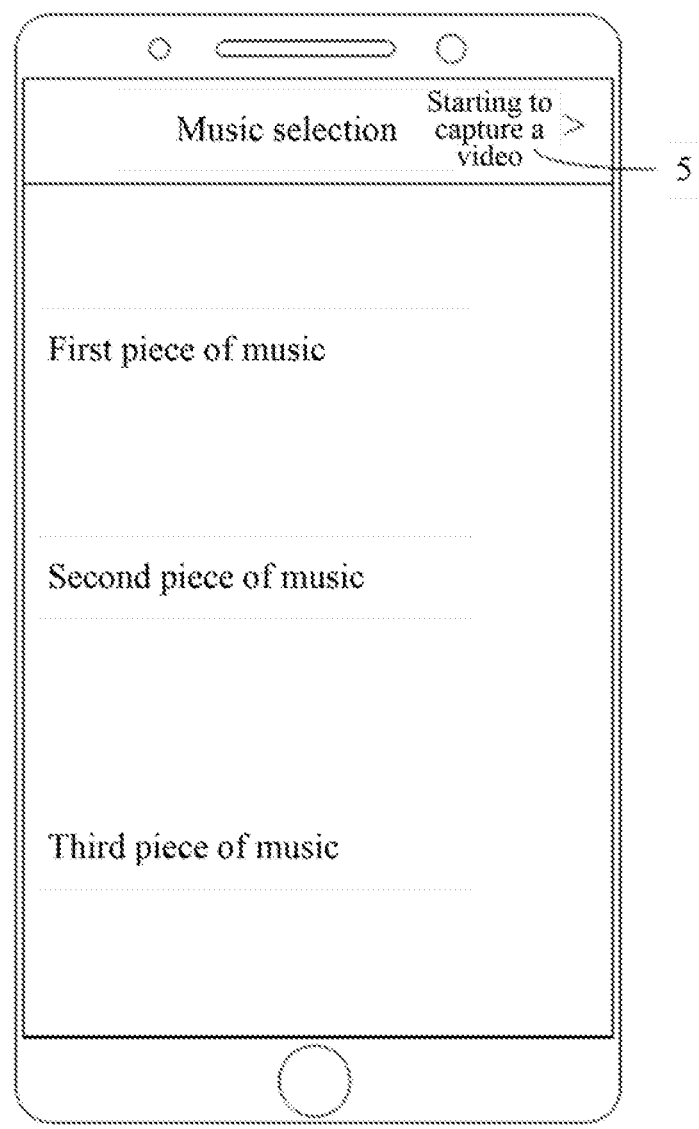
FIG. 5A is a schematic diagram of a music selection interface including an operation control of directly capturing according to an embodiment of the present disclosure.

In this embodiment, the target interface may be a music selection interface including a plurality of pieces of music and further including the operation control 5 for directly capturing, as shown in FIG. 5A.

If the trigger operation of the user on the operation control for directly capturing is detected on the target interface, the video capturing interface is jumped to. As shown in FIG. 3C, the video capturing interface includes a video capturing control 2. If the trigger operation of the user on the video capturing control 2 is detected, collecting the video image is started, and the corresponding scene sound is recorded while the video image is collected.

In step 320, after a trigger operation on a video capturing end control is detected or video capturing time reaches preset time, the video image and the scene sound are stored as a video file.

In this embodiment, the video capturing interface further includes a capturing end control, such as a next-step operation control 3 shown in FIG. 3C.

When the trigger operation on the video capturing end control is detected or the video capturing time reaches the preset time, the video capturing is determined to be finished, and the collected video image and the recorded scene sound are stored as the video file.

In step 330, after the video capturing is completed and a music selection instruction for a captured video is detected, a music replacement interface is displayed.

In this embodiment, the music selection instruction may be that the user triggers a music-selection operation control, such as the music-selection operation control 4 shown in FIG. 3D.

After the video capturing is completed, a preview playing interface as shown in FIG. 3D of a video is displayed, and the captured video is previewed and played on the preview playing interface. After the trigger operation of the user on the music-selection operation control 4 is detected, the music replacement interface as shown in FIG. 3E is jumped to. In this embodiment, the music replacement interface and the target interface have same display content, except that title names of interfaces are different.

In step 340, the music selected on the music replacement interface is taken as incidental music of the captured video, and audio track superposition on the incidental music with the scene sound are performed and the superposed incidental music is taken as the background music of the captured video.

On the music replacement interface, when the user is detected to select a certain piece of music, the operation control 1 of capturing using music as shown in FIG. 3F is displayed corresponding to the certain piece of music. If the trigger operation of the user on the operation control 1 of capturing using music is detected, the music selected by the user on the music replacement interface is taken as the incidental music of the captured video and superposed with the scene sound in audio track, and the superposed audio serves as the background music of the whole video. Then the preview playing interface as shown in FIG. 3D of the video is jumped to. The video and the background music selected by the user on the music replacement interface are played at the preview playing interface. If a trigger operation of the user on a confirmation operation control is detected at the preview playing interface, the video image and the superposed audio are synthesized into a video file. If the user is still not satisfied with the background music corresponding to the preview-played video, the user can continue to trigger the music-selection operation control and reselect the background music.

In the solutions of this embodiment, after the trigger operation on the operation control for directly capturing is detected at the target interface, the video capturing interface is displayed, and after the trigger operation on the video capturing control is detected, the video image is collected and the corresponding scene sound is recorded; after the trigger operation on the video capturing end control is detected or the video capturing time reaches the preset time, the video image and the scene sound are stored as the video file; and after the music selection instruction on the captured video is detected, the music replacement interface is displayed, the music selected on the music replacement interface is taken as the incidental music of the video, the audio track superposition is performed on the incidental music with the scene sound, and the superposed incidental music is taken as the background music of the captured video. In this way, after the user directly captures the video without selecting the background music, the user can also reselect background music without recapturing a video, thereby saving capture time.

On the basis of the above-mentioned solutions, optionally, after the step of taking the music selected on the music replacement interface as the incidental music of the captured video, performing the audio track superposition on the incidental music with the scene sound, and taking the superposed incidental music as the background music of the captured video, the method may further include steps described below. After a trigger operation on a sound adjustment control is detected, a volume bar of the scene sound and a volume bar of the incidental music are displayed. A volume ratio of the scene sound and a volume ratio of the incidental music are determined based on adjustment of the volume bar of the scene sound and the volume bar of the incidental music.

Figure 5B:
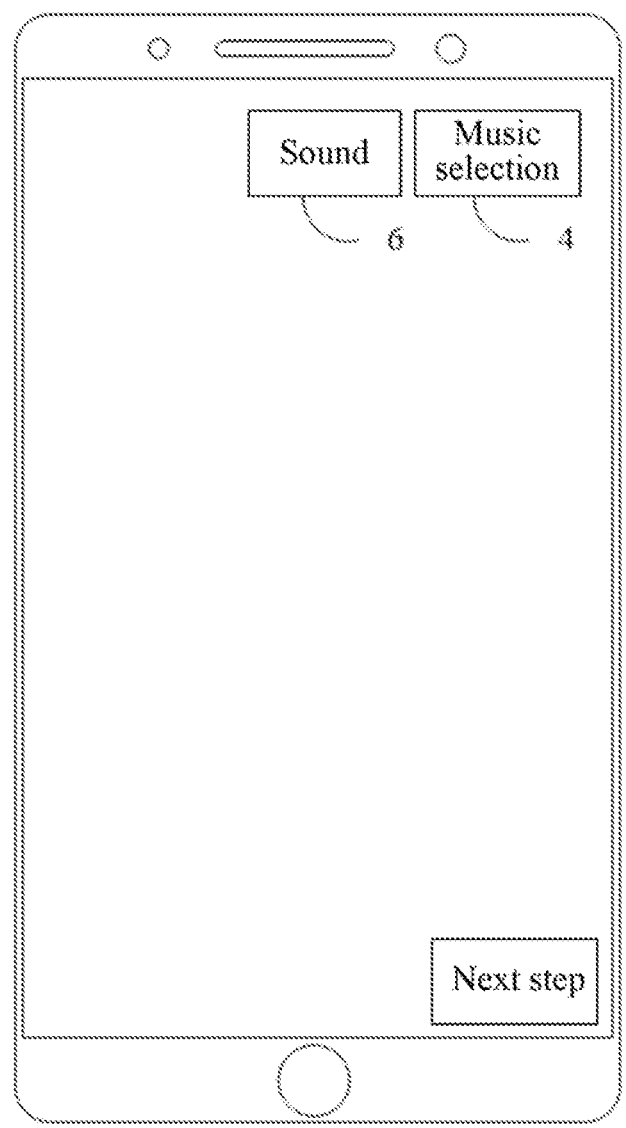
FIG. 5B is a schematic diagram of a preview playing interface including a sound adjustment control according to an embodiment of the present disclosure.
Figure 5C:
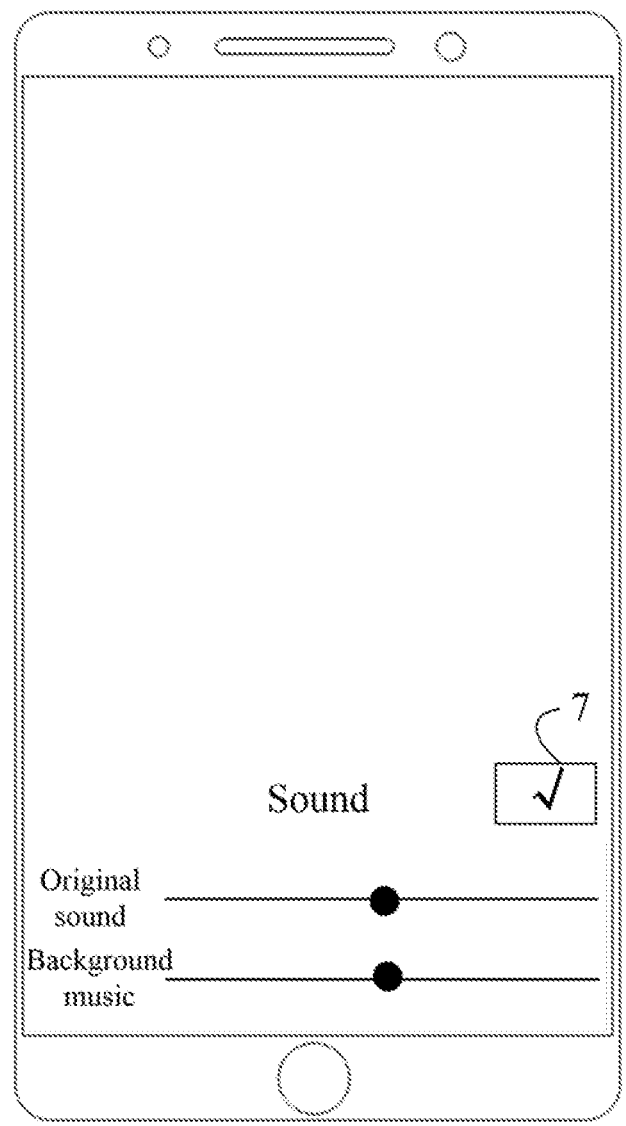
FIG. 5C is a schematic diagram of displaying a volume bar of scene sound and a volume bar of background music on a preview playing interface according to an embodiment of the present disclosure.

The music selected by the user on the music replacement interface is taken as the incidental music of the captured video, the audio track superposition is performed on the incidental music with the scene sound, the superposed incidental music is taken as the background music of the captured video, and then the background music of the captured video is previewed and played on the preview playing interface. The preview playing interface further includes a sound adjustment control, and as shown in FIG. 5B, the preview playing interface includes the sound adjustment control 6. If the trigger operation on the sound adjustment control is detected, the volume bar of the scene sound (also called an original sound) and the volume bar of the incidental music are displayed on the preview playing interface. As shown in FIG. 5C, the user can respectively drag a dragable control on the volume bar of the scene sound and a dragable control on the volume bar of the incidental music to respectively adjust a proportion of the scene sound to a maximum volume and a proportion of the incidental music to the maximum volume. For example, if the user wants to highlight the scene sound more, the user can turn up the volume ratio of the scene sound and turn down the volume ratio of the incidental music. After the adjustment is completed, the user can trigger the confirmation control (such as the confirmation control 7 shown in FIG. 5C). In this way, after a terminal device detects the trigger operation of the user on the confirmation control, the display of the volume bar of scene sound and the volume bar of incidental music is cancelled, that is, the preview playing interface shown in FIG. 5B is displayed. By setting the sound adjustment control and the corresponding volume bar, the interaction with the user is enhanced, thereby improving the user experience.

Figure 6:
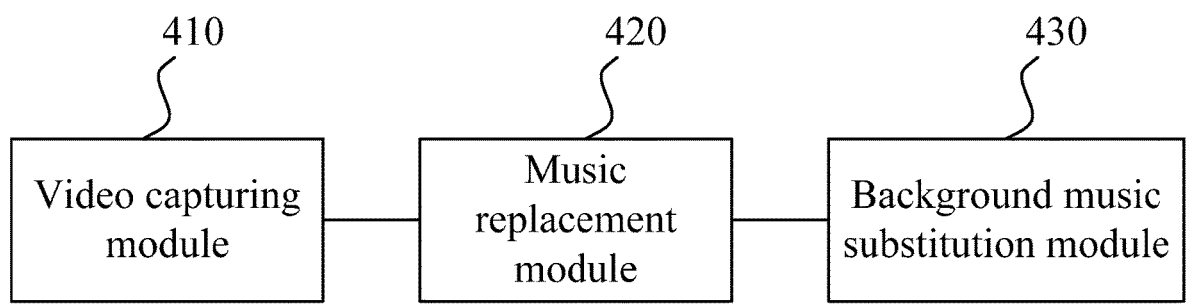
FIG. 6 is a structural diagram of an apparatus for determining background music of a video according to an embodiment of the present disclosure.

FIG. 6 is a structural diagram of an apparatus for determining background music of a video according to an embodiment of the present disclosure. This embodiment may be applied to a case where the background music of the video is selected after the video is captured. The apparatus can execute a method for determining the background music of the video. The apparatus can be implemented by software and/or hardware, and generally can be integrated into a terminal device such as a mobile phone or a tablet computer. As shown in FIG. 6, the apparatus for determining the background music of the video described in this embodiment includes a video capturing module 410, a music replacement module 420, and a background music substitution module 430.

In this embodiment, the video capturing module 410 is configured to acquire a scene selection instruction, and perform video capturing based on the scene selection instruction. The music replacement module 420 is configured to after the video capturing is completed and a music selection instruction for the captured video is detected, display a music replacement interface. The background music substitution module 430 is configured to determine background music of the captured video according to music selected on the music replacement interface.

In one embodiment, the video capturing module is configured to: after a trigger operation on an operation control of capturing using music is detected on a target interface, display a video capturing interface, and after a trigger operation on a video capturing control is detected, collect a video image and play background music selected on a target interface; or after a trigger operation on an operation control for directly capturing is detected on the target interface, display a video capturing interface, and after a trigger operation on a video capturing control is detected, collect a video image and record a corresponding scene sound.

In one embodiment, the apparatus further includes an associated storage module, which is configured to: after the video image is collected and the background music selected at the target interface is played, and the trigger operation on the video capturing end control is detected or the video capturing time reaches the preset time, associate the video image and the background music selected at the target interface and store the associated video image and background music.

In one embodiment, the apparatus further includes a video file storage module, which is configured to: after the video image is collected and the corresponding scene sound is recorded, and the trigger operation on the video capturing end control is detected or the video capturing time reaches the preset time, store the video image and the scene sound as the video file.

In one embodiment, the background music substitution module is configured to: replace the background music selected at the target interface with the music selected on the music replacement interface, such that the music selected on the music replacement interface serves as the background music of the video; or take the music selected on the music replacement interface as the incidental music of the video, and perform audio track superposition on the incidental music with the scene sound and take the superposed incidental music as the background music of the captured video.

In one embodiment, the apparatus further includes a volume bar display module and a volume adjustment module. The volume bar display module is configured to: after the music selected on the music replacement interface is taken as the incidental music of the video, the audio track superposition is performed on the incidental music with the scene sound and the superposed incidental music is taken as the background music of the captured video, and the trigger operation on the sound adjustment control is detected, display the volume bar of the scene sound and the volume bar of the incidental music. The volume adjustment module is configured to determine the volume ratio of the scene sound and the volume ratio of the incidental music based on adjustment of the volume bar of the scene sound and the volume bar of the incidental music.

The apparatus for determining the background music of the video can execute the method for determining the background music of the video provided by any embodiment of the present disclosure and have function modules and beneficial effects corresponding to the execution method. For technical details not described in this embodiment, reference can be made to the method for determining the background music of the video according to any embodiment of the present disclosure.

Figure 7:
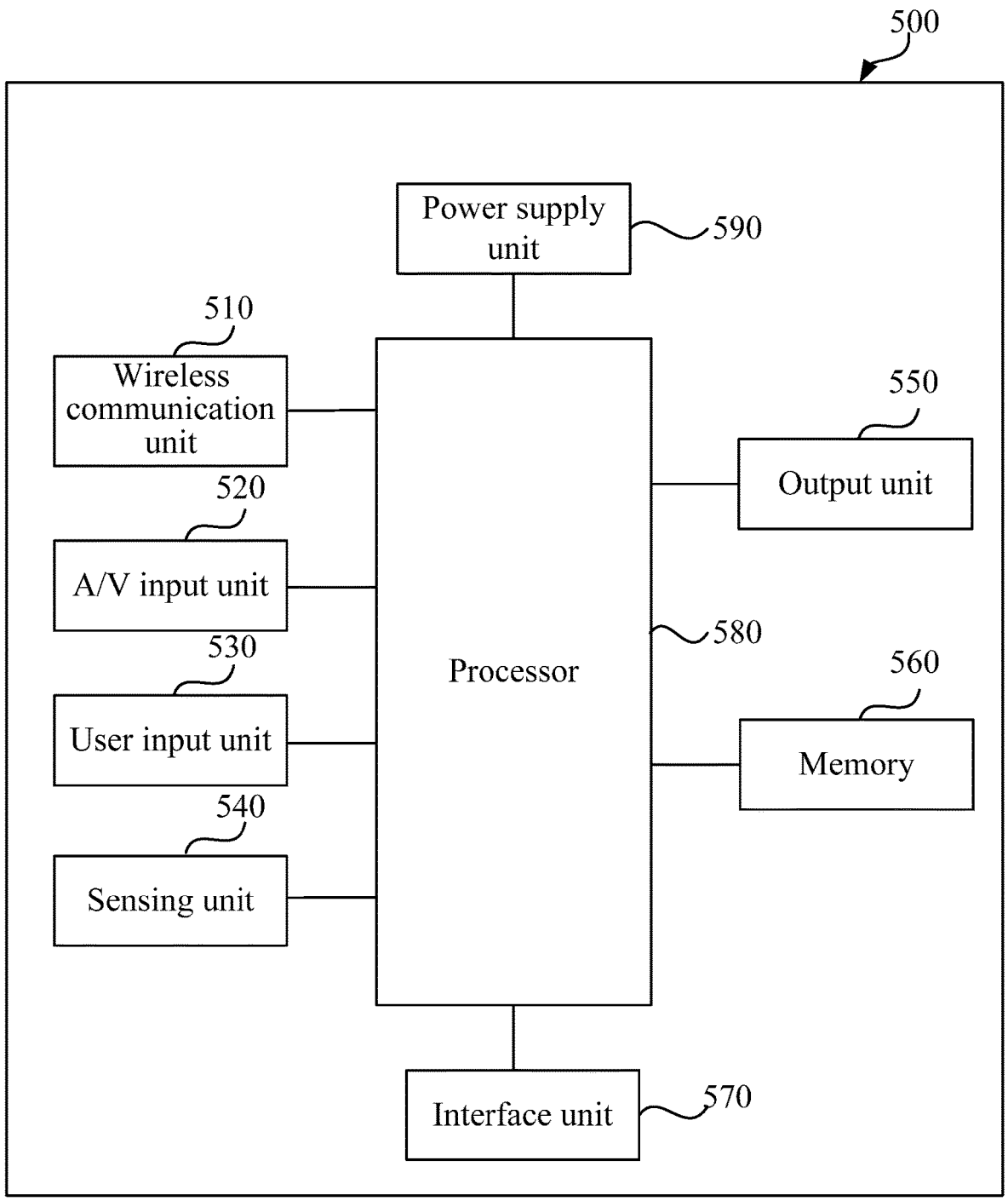
FIG. 7 is a schematic diagram of a hardware structure of a terminal device according to an embodiment of the present disclosure.

FIG. 7 is a schematic diagram of a hardware structure of a terminal device according to an embodiment of the present disclosure. The terminal device may be implemented in various forms. The terminal device in the present disclosure may include, but is not limited to, a mobile terminal device such as a mobile phone, a smart phone, a notebook computer, a digital broadcast receiver, a personal digital assistants (PDA), a portable android device (PAD), a portable multimedia player (PMP), a navigation apparatus, a vehicle-mounted terminal device, a vehicle-mounted display terminal, a vehicle-mounted electronic rearview mirror and the like, and a fixed terminal device such as a digital television (TV), a desktop computer and the like.

As shown in FIG. 7, the terminal device 500 may include a wireless communication unit 510, an audio/video (A/V) input unit 520, a user input unit 530, a sensing unit 540, an output unit 550, a memory 560, an interface unit 570, a processor 580, a power supply unit 590, and the like. FIG. 7 shows a terminal device having a variety of components. However, it is not required to implement all shown components, and more or fewer components may be implemented instead.

In one embodiment, the wireless communication unit 510 allows radio communication between the terminal device 500 and a wireless communication system or network. The A/V input unit 520 is configured to receive an audio signal or a video signal. The user input unit 530 may be configured to generate key input data according to a command input by the user to control at least one operation of the terminal device. The sensing unit 540 is configured to detect a current state of the terminal device 500, a position of the terminal device 500, the presence or absence of touch input of the user to the terminal device 500, an orientation of the terminal device 500, acceleration or deceleration movement and direction of the terminal device 500, and the like; and generate a command or signal for controlling the operation of the terminal device 500. The interface unit 570 serves as an interface through which at least one external apparatus can be connected to the terminal device 500 for communication. The output unit 550 is configured to provide an output signal in a visual, audio, and/or tactile manner. The memory 560 may be configured to store software programs for processing and controlling operations performed by the processor 580 and the like, or may temporarily store data that has been output or will be output. The memory 560 may include at least one type of storage medium. In addition, the terminal device 500 may cooperate with a network storage apparatus that performs a storage function of the memory 560 through a network connection. The processor 580 generally controls an overall operation of the terminal device. In addition, the processor 580 may include a multimedia module configured to reproduce or play back multimedia data. The processor 580 can perform pattern recognition processing so as to recognize handwriting input or picture drawing input performed on a touch screen as characters or images. The power supply unit 590 receives external or internal power under the control of the processor 580 and provides appropriate power required to operate at least one element and component.

The processor 580 executes at least one functional application of the terminal device 500 and data processing by running a program stored in the memory 560, for example, implements the method for determining the background music of the video provided by any embodiment of the present disclosure. For example, the method includes: acquiring a scene selection instruction, and performing video capturing based on the scene selection instruction; after the video capturing is completed and a music selection instruction for the captured video is detected, displaying a music replacement interface; and determining background music of the captured video according to music selected on the music replacement interface.

An embodiment of the present disclosure further provides a storage medium including computer-executable instructions, and the computer-executable instructions are configured to, when executed by a processor, cause the processor to implement a method for determining background music of a video. The method includes: acquiring a scene selection instruction, and performing video capturing based on the scene selection instruction; after the video capturing is completed and a music selection instruction for the captured video is detected, displaying a music replacement interface;

and determining background music of the captured video according to music selected on the music replacement interface.

In the storage medium including the computer-executable instructions provided by the embodiment of the present disclosure, the computer-executable instructions implement not only the above-mentioned method operations but also related operations in the method for determining the background music of the video provided by any embodiment of the present disclosure.

Through the description of the above-mentioned implementation modes, it will be apparent to those skilled in the art that the present disclosure may be implemented by software plus general-purpose hardware, or may be implemented by hardware. Based on this understanding, the solutions provided by the present disclosure may be embodied in the form of a software product. The computer software product is stored in a computer-readable storage medium, such as a computer floppy disk, a read-only memory (ROM), a random access memory (RAM), a flash, a hard disk or an optical disk, and includes multiple instructions for causing a computer device (which may be a personal computer, a server or a network device) to execute the method according to any embodiment of the present disclosure.

Multiple units and modules included in the embodiment of the above-mentioned apparatus for determining the background music of the video are just divided according to functional logic, and the division is not limited to this, as long as the corresponding functions can be achieved. In addition, names of each functional unit are just intended for being easily distinguished from each other, and are not intended to limit the scope of the present disclosure.

What is claimed is:

1. A method for determining background music of a video, comprising:
   acquiring a scene selection instruction, and performing video capturing based on the scene selection instruction;
   after the video capturing is completed and a music selection instruction for the captured video is detected, displaying a music replacement interface, wherein displaying a music replacement interface comprises displaying a plurality of pieces of music on the music replacement interface in a form of information flow;
   wherein displaying the plurality of pieces of music on the music replacement interface in the form of information flow comprises requesting a server to acquire a set amount of music, displaying the set amount of music on the music replacement interface in response to detecting a request operation, requesting, in response to detecting a refresh operation, the server again to acquire a set amount of updated music, receiving the set amount of updated music, and displaying the set amount of updated music on the music replacement interface; and
   determining background music of the captured video according to music selected on the music replacement interface;
   wherein determining the background music of the captured video according to the music selected on the music replacement interface comprises:
   in response to the scene selection instruction being an instruction indicating that the video capturing is performed after background music is selected on a target interface, replacing the background music selected on the target interface with the music selected on the music replacement interface as the background music of the captured video;
   in response to the scene selection instruction being an instruction indicating that the video capturing is performed without selection of background music on a target interface, using the music selected on the music replacement interface as incidental music of the captured video, and performing audio track superposition on the incidental music with the scene sound to generate superposed incidental music and using the superposed incidental music as the background music of the captured video.

2. The method of claim 1, wherein acquiring the scene selection instruction, and performing the video capturing based on the scene selection instruction comprises:
   after a trigger operation on an operation control for capturing video and music is detected on the target interface, displaying a video capturing interface, and after a trigger operation on a video capturing control is detected, collecting a video image and playing the background music selected on the target interface; or
   after a trigger operation on an operation control for capturing video without selection of the background music on the target interface is detected on the target interface, displaying a video capturing interface, and after a trigger operation on a video capturing control is detected, collecting a video image and recording a corresponding scene sound.

3. The method of claim 2, wherein after collecting the video image and playing the background music selected on the target interface, the method further comprises:
   after a trigger operation on a video capturing end control is detected or video capturing time reaches preset time, associating the video image with the background music selected on the target interface and storing the associated video image and background music.

4. The method of claim 2, wherein after collecting the video image and recording the corresponding scene sound, the method further comprises:
   after a trigger operation on a video capturing end control is detected or video capturing time reaches preset time, storing the video image and the corresponding scene sound as a video file.

5. The method of claim 1, wherein after using the music selected on the music replacement interface as the incidental music of the captured video, and performing the audio track superposition on the incidental music with the scene sound to generate the superposed incidental music and using the superposed incidental music as the background music of the captured video, the method further comprises:
   after a trigger operation on a sound adjustment control is detected, displaying a volume bar of the scene sound and a volume bar of the incidental music; and
   determining a volume ratio of the scene sound and a volume ratio of the incidental music based on adjustment of the volume bar of the scene sound and the volume bar of the incidental music.

6. The terminal device of claim 1, wherein the at least one program is configured to cause the at least one processor to further implement, after using the music selected on the music replacement interface as the incidental music of the captured video, and performing the audio track superposition on the incidental music with the scene sound to generate the superposed incidental music and using the superposed incidental music as the background music of the captured video, the following steps:

after a trigger operation on a sound adjustment control is detected, displaying a volume bar of the scene sound and a volume bar of the incidental music; and determining a volume ratio of the scene sound and a volume ratio of the incidental music based on adjustment of the volume bar of the scene sound and the volume bar of the incidental music.

7. The non-transitory computer-readable storage medium of claim 1, wherein the at least one computer program is configured to cause the processor to further implement, after using the music selected on the music replacement interface as the incidental music of the captured video, and performing the audio track superposition on the incidental music with the scene sound to generate the superposed incidental music and using the superposed incidental music as the background music of the captured video, the following steps:

after a trigger operation on a sound adjustment control is detected, displaying a volume bar of the scene sound and a volume bar of the incidental music; and determining a volume ratio of the scene sound and a volume ratio of the incidental music based on adjustment of the volume bar of the scene sound and the volume bar of the incidental music.

8. A terminal device, comprising:
at least one processor; and
a storage apparatus, configured to store at least one program;
wherein the at least one program is configured to, when executed by the at least one processor, cause the at least one processor to implement the following steps:
acquiring a scene selection instruction, and performing video capturing based on the scene selection instruction;
after the video capturing is completed and a music selection instruction for the captured video is detected, displaying a music replacement interface, wherein displaying a music replacement interface comprises displaying a plurality of pieces of music on the music replacement interface in a form of information flow;
wherein displaying the plurality of pieces of music on the music replacement interface in the form of information flow comprises requesting a server to acquire a set amount of music, displaying the set amount of music on the music replacement interface in response to detecting a request operation, requesting, in response to detecting a refresh operation, the server again to acquire a set amount of updated music, receiving the set amount of updated music, and displaying the set amount of updated music on the music replacement interface; and
determining background music of the captured video according to music selected on the music replacement interface;
wherein determining the background music of the captured video according to the music selected on the music replacement interface comprises:
in response to the scene selection instruction being an instruction indicating that the video capturing is performed after background music is selected on a target interface, replacing the background music selected on the target interface with the music selected on the music replacement interface as the background music of the captured video;
in response to the scene selection instruction being an instruction indicating that the video capturing is performed without selection of background music on a target interface, using the music selected on the music replacement interface as incidental music of the captured video, and performing audio track superposition on the incidental music with the scene sound to generate superposed incidental music and using the superposed incidental music as the background music of the captured video.

9. The terminal device of claim 8, wherein the at least one program is configured to cause the at least one processor to implement the steps of acquiring the scene selection instruction, and performing the video capturing based on the scene selection instruction by:

after a trigger operation on an operation control for capturing video and music is detected on the target interface, displaying a video capturing interface, and after a trigger operation on a video capturing control is detected, collecting a video image and playing the background music selected on the target interface; or after a trigger operation on an operation control for capturing video without selection of the background music on the target interface is detected on the target interface, displaying a video capturing interface, and after a trigger operation on a video capturing control is detected, collecting a video image and recording a corresponding scene sound.

10. The terminal device of claim 9, wherein the at least one program is configured to cause the at least one processor to further implement the following steps:

after a trigger operation on a video capturing end control is detected or video capturing time reaches preset time, associating the video image with the background music selected on the target interface and storing the associated video image and background music.

11. The terminal device of claim 9, wherein the at least one program is configured to cause the at least one processor to further implement the following steps:

after a trigger operation on a video capturing end control is detected or video capturing time reaches preset time, storing the video image and the corresponding scene sound as a video file.

12. A non-transitory computer-readable storage medium, configured to store at least one computer program, wherein the at least one computer program is configured to, when executed by a processor, cause the processor to implement the following steps:

acquiring a scene selection instruction, and performing video capturing based on the scene selection instruction;

after the video capturing is completed and a music selection instruction for the captured video is detected, displaying a music replacement interface, wherein displaying a music replacement interface comprises displaying a plurality of pieces of music on the music replacement interface in a form of information flow;

wherein displaying the plurality of pieces of music on the music replacement interface in the form of information flow comprises requesting a server to acquire a set amount of music, displaying the set amount of music on the music replacement interface in response to detecting a request operation, requesting, in response to detecting a refresh operation, the server again to acquire a set amount of updated music, receiving the set amount of updated music, and displaying the set amount of updated music on the music replacement interface; and determining background music of the captured video according to music selected on the music replacement interface;

wherein determining the background music of the captured video according to the music selected on the music replacement interface comprises:

in response to the scene selection instruction being an instruction indicating that the video capturing is performed after background music is selected on a target interface, replacing the background music selected on the target interface with the music selected on the music replacement interface as the background music of the captured video;

in response to the scene selection instruction being an instruction indicating that the video capturing is performed without selection of background music on a target interface, using the music selected on the music replacement interface as incidental music of the captured video, and performing audio track superposition on the incidental music with the scene sound to generate superposed incidental music and using the superposed incidental music as the background music of the captured video.

13. The non-transitory computer-readable storage medium of claim 12, wherein the at least one computer program is configured to cause the processor to implement the steps of acquiring the scene selection instruction, and performing the video capturing based on the scene selection instruction by:

after a trigger operation on an operation control for capturing video and music is detected on the target interface, displaying a video capturing interface, and after a trigger operation on a video capturing control is detected, collecting a video image and playing the background music selected on the target interface; or after a trigger operation on an operation control for capturing video without selection of the background music on the target interface is detected on the target interface, displaying a video capturing interface, and after a trigger operation on a video capturing control is detected, collecting a video image and recording a corresponding scene sound.

14. The non-transitory computer-readable storage medium of claim 13, wherein the at least one computer program is configured to cause the processor to further implement the following steps:

after a trigger operation on a video capturing end control is detected or video capturing time reaches preset time, associating the video image with the background music selected on the target interface and storing the associated video image and background music.

15. The non-transitory computer-readable storage medium of claim 13, wherein the at least one computer program is configured to cause the processor to further implement the following steps:

after a trigger operation on a video capturing end control is detected or video capturing time reaches preset time, storing the video image and the corresponding scene sound as a video file.

* * * * *